United States Patent
Matsuoka et al.

(10) Patent No.: US 12,057,601 B2
(45) Date of Patent: Aug. 6, 2024

(54) LIQUID COMPOSITION

(71) Applicant: RICOH COMPANY, LTD., Tokyo (JP)

(72) Inventors: Kohji Matsuoka, Kanagawa (JP);
Ryuji Higashi, Kanagawa (JP);
Masahiro Masuzawa, Kanagawa (JP);
Hideo Yanagita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 495 days.

(21) Appl. No.: 17/424,972

(22) PCT Filed: Jan. 22, 2020

(86) PCT No.: PCT/JP2020/002148
§ 371 (c)(1),
(2) Date: Jul. 22, 2021

(87) PCT Pub. No.: WO2020/158545
PCT Pub. Date: Aug. 6, 2020

(65) Prior Publication Data
US 2022/0013865 A1    Jan. 13, 2022

(30) Foreign Application Priority Data

Jan. 28, 2019 (JP) ................. 2019-012588
Nov. 28, 2019 (JP) ................. 2019-215743

(51) Int. Cl.
| | |
|---|---|
| C09D 7/40 | (2018.01) |
| C09D 7/20 | (2018.01) |
| C09D 7/61 | (2018.01) |
| C09D 187/00 | (2006.01) |
| H01M 50/486 | (2021.01) |
| C08K 3/22 | (2006.01) |

(52) U.S. Cl.
CPC .......... H01M 50/486 (2021.01); C09D 7/20 (2018.01); C09D 7/61 (2018.01); C09D 7/69 (2018.01); C09D 187/005 (2013.01); *C08K 2003/2227* (2013.01); *C08K 2201/005* (2013.01)

(58) Field of Classification Search
CPC ..... H01M 50/486; C09D 187/00; C09D 7/20; C09D 7/61; C09D 7/40
USPC ........................................... 524/437
See application file for complete search history.

(56) References Cited

U.S. PATENT DOCUMENTS

| | | |
|---|---|---|
| 7,390,528 B2 | 6/2008 | Morii |
| 10,090,554 B2 | 10/2018 | Yanagita et al. |
| 2006/0007288 A1* | 1/2006 | Takada .................. C09D 11/54 347/100 |
| 2008/0118826 A1 | 5/2008 | Shimamura et al. |
| 2011/0169903 A1* | 7/2011 | Hayata .................. C09D 11/32 347/102 |
| 2013/0224559 A1 | 8/2013 | Furutani et al. |
| 2015/0155536 A1 | 6/2015 | Suzuki |
| 2018/0261827 A1 | 9/2018 | Yanagita et al. |
| 2019/0288259 A1 | 9/2019 | Ohkimoto et al. |
| 2019/0288276 A1 | 9/2019 | Utsuki et al. |
| 2020/0119333 A1 | 4/2020 | Masuzawa et al. |
| 2020/0220160 A1 | 7/2020 | Nakajima et al. |

FOREIGN PATENT DOCUMENTS

| | | |
|---|---|---|
| CN | 103384928 | 11/2013 |
| JP | 2000-277386 A | 10/2000 |
| JP | 2006-173001 A | 6/2006 |
| JP | 2006-299117 | 11/2006 |
| JP | 3885801 B2 | 2/2007 |
| JP | 2009-235383 | 10/2009 |
| JP | 2009-242649 | 10/2009 |
| JP | 6152177 B1 | 6/2017 |
| JP | 2018-044029 | 3/2018 |
| JP | 2019-061943 A | 4/2019 |
| JP | 2019-164982 A | 9/2019 |
| JP | 2019-164983 A | 9/2019 |
| JP | 2020-055926 A | 4/2020 |
| JP | 2020-056000 A | 4/2020 |
| JP | 2020-113532 A | 7/2020 |
| JP | 2020-119888 A | 8/2020 |

OTHER PUBLICATIONS

International Search Report and Written Opinion issued Apr. 3, 2020 in PCT/JP2020/002148 filed Jan. 22, 2020.
Chinese Office Action dated Feb. 23, 2023, in Chinese Application No. 2020800108486, with English translation, 14 pages.
Japanese Submission of Publications dated Apr. 30, 2024, in Japanese Application No. 2019-215743, with English translation, 5 pages.

* cited by examiner

*Primary Examiner* — Deve V Hall
(74) *Attorney, Agent, or Firm* — Grüneberg and Myers PLLC

(57) ABSTRACT

A disclosed liquid composition includes particles; a resin; a solvent A; and a solvent B differing from the solvent A, wherein a surface tension with respect to air at 25° C. is 25 mN/m or more and less than 50 mN/m, a 90% diameter is 2.5 μm or less, and a median diameter is 1 μm or less.

9 Claims, 2 Drawing Sheets

[Fig. 1]
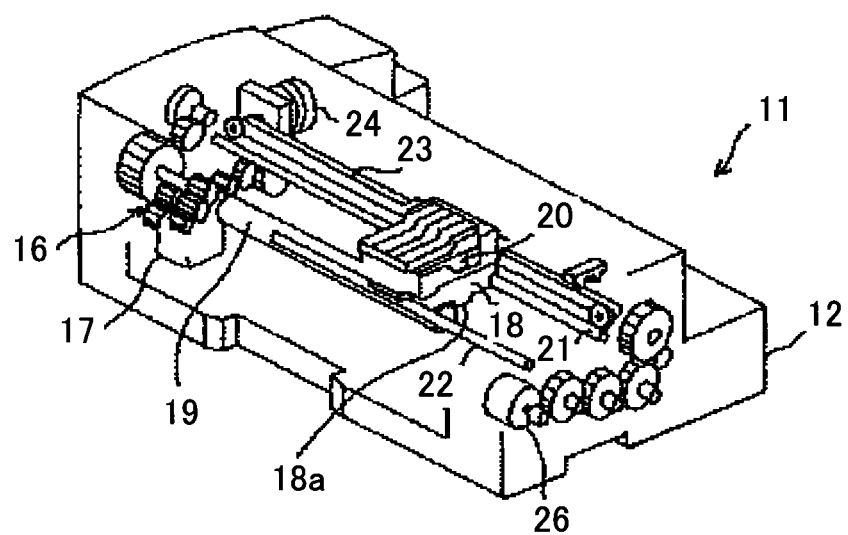

[Fig. 2A]
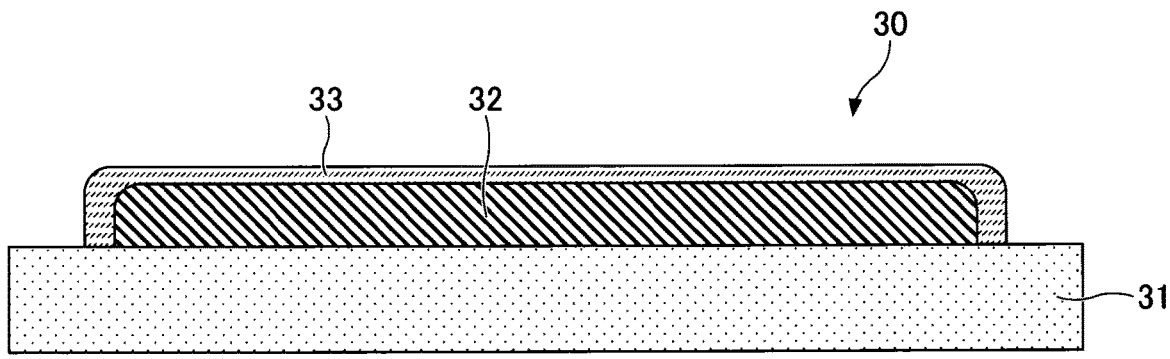
[Fig. 2B]
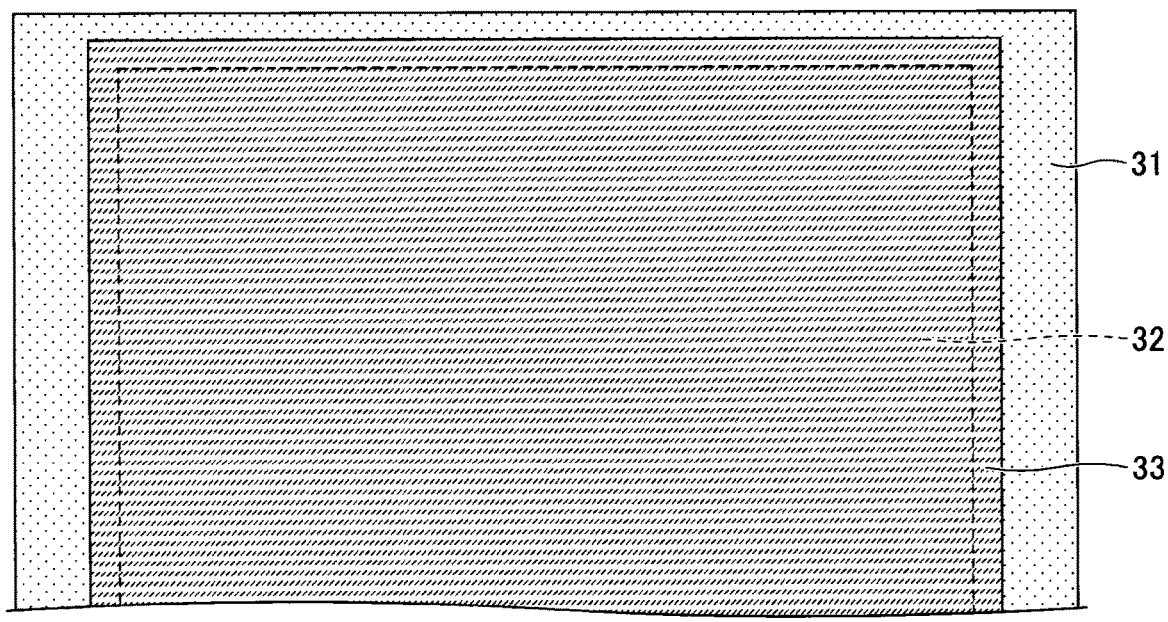

LIQUID COMPOSITION

TECHNICAL FIELD

The disclosures discussed herein relate to a liquid composition.

BACKGROUND ART

The related-art electrochemical devices, such as lithium-ion rechargeable batteries, electric double layer capacitors, lithium ion capacitors, and redox capacitors, typically employ paper, non-woven fabric, and porous films as separators to prevent short circuits between positive and negative electrodes.

Japanese Unexamined Patent Application Publication No. 2000-277386 (Patent Document 1) and Japanese Unexamined Patent Application Publication No. 2006-173001 (Patent Document 2), for example, lately disclose electrochemical devices that include an integrated separator electrode. Such an integrated separator electrode is obtained by forming an electrode mixture layer and a particle layer sequentially on an electrode substrate.

The integrated separator electrode is typically produced by applying a particle-containing liquid composition onto the electrode mixture layer.

CITATION LIST

Patent Literature

[PTL 1] Japanese Unexamined Patent Application Publication No. 2000-277386
[PTL 2] Japanese Unexamined Patent Application Publication No. 2006-173001

SUMMARY OF INVENTION

Technical Problem

However, the electrode mixture layer used in the integrated separator electrode is an absorbing medium having a porous structure. Hence, when the particle-containing liquid composition is applied onto the electrode mixture layer, particles contained in the liquid composition are inserted into the electrode mixture layer while the liquid composition is absorbed by the electrode mixture layer. This results in a reduction in the thickness of the particle layer. Accordingly, electrically insulating resistance between the electrode substrate and the particle layer, namely, an electrically insulating resistance of the integrated separator electrode is reduced.

Insertion of particles into the electrode mixture layer is inhibited by increasing a contact angle of the liquid composition with respect to the electrode mixture layer, which increases the resistance of the integrated separator electrode. In this case; however, the coffee ring effect occurs, which increases instability of the resistance of the integrated separator electrode.

Accordingly, an aspect of the invention is to provide a liquid composition capable of improving electrically insulating resistance of the integrated separator electrode while preventing the occurrence of the coffee ring effect.

Solution to Problem

An aspect of this disclosure provides a liquid composition that includes
  particles;
  a resin;
  a solvent A; and
  a solvent B differing from the solvent A,
  wherein a surface tension with respect to air at 25° C. is 25 mN/m or more and less than 50 mN/m, a 90% diameter is 2.5 µm or less, and a median diameter is 1 µm or less.

Another aspect of this disclosure provides a liquid composition that includes
  particles;
  a resin;
  a solvent A; and
  a solvent B differing from the solvent A,
  wherein when $D_{50A+B}$ (µm) represents a median diameter of the liquid composition, $D_{90A+B}$ (µm) represents a 90% diameter of the liquid composition, $D_{50A}$ (µm) represents a median diameter of a first dispersion liquid obtained by removing the solvent B from the liquid composition, and $D_{50B}$ (µm) represents a median diameter of a second dispersion liquid obtained by removing the solvent A from the liquid composition, the liquid composition satisfies the following formulas:

$1 < D_{50B}/D_{50A}$, $1 < D_{50A+B}/D_{50A} < 1.1$, and $D_{90A+B} < 5$ (µm).

Still another aspect of this disclosure provides a liquid composition that includes
  a dispersion liquid containing particles, a resin, and a solvent A; and
  a solvent B differing from the solvent A, the liquid composition being produced by adding the solvent B to the dispersion liquid,
  wherein the liquid composition has a surface tension with respect to air at 25° C. of 25 mN/m or more and less than 50 mN/m, and a 90% diameter of 2.5 µm or less, and
  wherein the dispersion liquid has a median diameter of 1 µm or less.

BRIEF DESCRIPTION OF DRAWINGS

FIG. 1 is a schematic perspective view illustrating an example of a liquid ejecting device; and
FIG. 2A is a schematic cross-sectional view illustrating an example of an integrated separator electrode.
FIG. 2B is a schematic top view illustrating an example of an integrated separator electrode.

DESCRIPTION OF EMBODIMENTS

Property 1 of Liquid Composition
A liquid composition according to the present embodiment contains particles, resin, a solvent A, and a solvent B differing from the solvent A.

The solvent A is a solvent having a function of dispersing particles in a liquid composition.

The solvent B is a solvent configured to compensate for an insufficient function of the solvent A.

Examples of the solvent B other than those having the function of dispersing particles may include solvents having a high boiling point configured to prevent nozzles of a liquid ejecting head from drying, solvents configured to adjust the viscosity and surface tension suitable for discharging from the liquid discharge head, and solvents configured to prevent the absorption of particles into the electrode mixture layer.

Preferably, a surface tension of the liquid composition according to the present embodiment with respect to air at 25° C. is 25 mN/m or more and less than 50 mN/m. When the surface tension of the liquid composition with respect to air at 25° C. is less than 25 mN/m, the resistance of the integrated separator electrode is reduced, whereas when the surface tension of the liquid composition with respect to air at 25° C. is 50 mN/m or more, the coffee ring effect occurs.

A 90% diameter of the liquid composition according to the present embodiment is 2.5 µm or less and preferably 2.0 µm or less. The 90% diameter of the liquid composition exceeding 2.5 µm reduces the dispersibility of the liquid composition.

A median diameter of the liquid composition according to the present embodiment is 1 µm or less and preferably 0.8 µm or less. The median diameter of the liquid composition exceeding 1 µm reduces the Brownian motion of the particles, which reduces dispersion stability of the liquid composition.

As used herein and in the claims, the 90% diameter represents a minimum value of a particle size at the 90% point (minimum 90% diameter) of the volume-based cumulative particle size distribution, and the median diameter represents a minimum value of a particle size at the 50% point (minimum median diameter) of the volume-based cumulative particle size distribution, respectively, as measured by laser diffraction.

Note that the 90% diameter is used as an indicator of the presence or absence of coarse particles due to poor dispersion or an indicator of re-aggregation due to excessive dispersion; that is, the 90% diameter is used as an indicator of dispersibility.

By contrast, the median diameter is used as an indicator of dispersion stability because the median diameter is sensitive to a microscopic dispersion environment. In other words, when the median diameter is large, particles tend to settle, making it difficult to maintain dispersion.

The liquid composition according to the present embodiment may be produced by adding a solvent B to a dispersion liquid containing particles, resin, and a solvent A.

In order to adjust viscosity, adjust surface tension, control evaporation of solvents, improve solubility of additives, improve dispersibility of particles, disinfection, or the like, the liquid composition according to the present embodiment may further contain a surfactant, pH regulator, anticorrosive agent, antiseptic agent, antifungal agent, antioxidant, antireductive agent, vaporization promoter, chelating agent, or the like.

The liquid composition according to the present embodiment may be prepared by using known dispersion devices.

Examples of dispersion devices include agitators, ball mills, bead mills, ring-type mills, high-pressure dispersers, rotary high-speed shearing devices, ultrasonic dispersion devices, and the like.

Particles

The particles may be organic or inorganic particles; however, it is preferable that the particles be inorganic in consideration of heat resistance.

It is also preferable that the particles be electrically insulating particles in consideration of electrical insulation.

Examples of materials forming inorganic particles include, for example, aluminum oxide, silica, calcium carbonate, titanium oxide, calcium phosphate, silicon oxide, zirconium oxide, and the like. Among these, inorganic oxides, such as aluminum oxide and silica, are preferable for producing the integrated separator electrode because inorganic oxides exhibit high electrical insulation and high heat resistance. Furthermore, aluminum oxide is further preferable because aluminum oxide functions as a scavenger for "junk" chemical species, which causes capacity fading within lithium-ion rechargeable batteries. In addition, aluminum oxide has excellent wettability for electrolyte, thus increasing the absorption rate of electrolyte and improving the cycle performance of lithium-ion rechargeable batteries.

Examples of materials forming the organic particles include, for example, polyvinylidene fluoride (PVDF), polyvinylpyrrolidone (PVP), polyester, polypropylene, polyethylene, chitin, chitosan, cellulose, carboxymethylcellulose (CMC), polystyrene, melamine resin, and the like.

Resin

The number average molecular weight of resin is normally 1000 to 100000, and is preferably 1000 to 10000, and further preferably 1000 to 5000, in order to prevent the increase in viscosity of the liquid composition.

Preferably, the resin is a polymeric dispersant having dispersible groups and adsorptive groups. In view of the adsorptive strength with particles, when the particles are charged, the resin is preferably a polymeric dispersant that has ionic groups with polarity opposite to the polarity of the charged particles as adsorptive groups.

Examples of ionic groups include, for example, sulfonic acid groups and their salts (e.g., potassium salts, sodium salts, lithium salts, ammonium salts), carboxyl groups and their salts (e.g., potassium salts, sodium salts, lithium salts, ammonium salts), primary, secondary, tertiary amino groups and their salts.

The ionic groups may be either anionic groups or cationic groups, but may be preferably anionic groups in consideration of dispersibility of the inorganic particles.

Examples of the anionic groups may include salts of carboxyl groups, salts of sulfonic acid groups, salts of phosphate groups, and the like.

The ionic groups are usually present on the side chains or both ends of the polymeric dispersant; however, ionic groups may preferably be present on the side chains of the polymeric dispersant in order to inhibit the increase in viscosity of the liquid composition.

The dispersible groups to be used may be any dispersible groups having a structure to be soluble in a solvent A and a solvent B. However, when the resin is used for a lithium-ion secondary battery, oligoether groups may be preferable from the viewpoint of ionic conductivity.

The oligoether group is a group obtained by removing a hydroxyl group from an end of a polymer of ethylene glycol or propylene glycol.

The molecular weight of the polymer of ethylene glycol or propylene glycol is preferably 100 to 10,000, and further preferably 100 to 5,000. When the molecular weight of the polymer of ethylene glycol or propylene glycol is 100 or more, the particle dispersibility is improved, and when the molecular weight is 10,000 or less, the increase in the viscosity of the liquid composition can be inhibited.

The unbonded end of the oligoether group may include a hydroxyl group, a methoxy group, an ethoxy group, a propoxy group, or the like.

Note that when a resin having an oligoether group is used, the particle dispersibility may be improved even when solvents with high polarity are used as the solvent A and the solvent B.

Examples of commercially available polymeric dispersants include DISPERBYK103, DISPERBYK-118, DISPERBYK-2155 (produced by BYK-Chemie), NOP- COSPERSE-092, SN-SPERSE-2190, SN-DISPERSANT-9228 (produced by SAN NOPCO LIMITED), ESLEAM AD-3172M, ESLEAM 2093, MALIALIM AKM0513, MALIALIM HKM-50A, MALIALIM HKM-150A, MALIALIM SC-0505K, MALIALIM SC-1015F, and MALIALIM SC-0708A (produced by NOF CORPORATION).

The mass ratio of the polymeric dispersant to the particles is normally 0.01% to 10%, and is preferably 0.1% to 10%, in view of the particle dispersibility.

Note that as a resin, a polymeric dispersant and a binder may be combined.

Examples of binders include polyvinylidene fluoride, styrene butadiene rubber, acrylic resin, and the like.

The binder may be dissolved or dispersed in a liquid composition.

Note that a precursor of the binder may be used instead of the binder.

Examples of a precursor of the binder include monomers and the like.

For example, a liquid composition containing monomers and optionally further containing a polymerization initiator is applied onto the absorbing medium, which is then heated or illuminated to cause monomer polymerization to form a binder.

Solvent A

A solvent A is preferably a lactam, alcohol, sulfoxide, ester, or ketone.

Specific examples of lactams include, for example, 1-methyl-2-pyrrolidone, 2-pyrrolidone, and the like.

Specific examples of alcohols include an isopropyl alcohol, butanol, diacetone alcohol, and the like.

Specific examples of sulfoxides include dimethyl sulfoxide, and the like.

Specific examples of esters include, for example, ethyl acetate, butyl acetate, ethyl lactate, ethylene glycol diacetate, and the like.

Specific examples of ketones include diisobutyl ketone, 2-butanone, 2-pentanone, diacetone alcohol, and the like.

Solvent B

A solvent B is preferably an ether, glycol, ester, alcohol, or lactam.

Specific examples of ethers include propylene glycol monopropyl ether, and the like.

Specific examples of glycols include propylene glycol, ethylene glycol, triethylene glycol, hexylene glycol, and the like.

Specific examples of esters include ethyl lactate, ethylene carbonate, ethylene glycol diacetate, and the like.

Specific examples of alcohols include cyclohexanol, propylene glycol monopropyl ether, and the like.

Specific examples of lactams include, for example, 2-pyrrolidone, and the like.

Property 2 of Liquid Composition

The liquid composition according to the present embodiment contains particles, resin, a solvent A, and a solvent B differing from the solvent A.

When $D_{50A+B}$ (m) represents a median diameter of the liquid composition according to the present embodiment, $D_{90A+B}$ (m) represents a 90% diameter of the liquid composition according to the present embodiment, $D_{50A}$ (m) represents a median diameter of a first dispersion liquid obtained by removing the solvent B from the liquid composition according to the present embodiment, and $D_{50B}$ (m) represents a median diameter of a second dispersion liquid obtained by removing the solvent A from the liquid composition according to the present embodiment, the liquid composition satisfies the following formulas:

$1 < D_{50B}/D_{50A}$;

$1 < D_{50A+B}/D_{50A} < 1.1$; and $D_{90A+B} < 5$.

When $D_{50B}/D_{50A}$ is equal to or less than 1, the difference in the particle dispersibility between the solvent A and the solvent B is reduced, such that the particles are readily inserted into the electrode mixture layer.

When $D_{50A+B}/D_{50A}$ is equal to or less than 1, the difference in particle dispersibility between the solvent A and the solvent B is reduced, such that the particles are readily inserted into the electrode mixture layer. When $D_{50A+B}/D_{50A}$ is equal to or greater than 1.1, the dispersibility of the liquid composition is poor, the particles tend to aggregate, and the difference between the nozzle size of the liquid ejecting head and the particle size is reduced, allowing the nozzles to easily become clogged.

When the $D_{90A+B}$ is 5 or more (m), the difference between the nozzle size of the liquid ejecting head and the particle size is reduced, allowing the nozzles to easily become clogged.

As used herein and in the claims, a dispersion liquid, which is obtained by removing a solvent A (solvent B) from the liquid composition, indicates a dispersion liquid that includes (1) a solution having a solvent B (solvent A) and resin, and (2) particles dispersed by the resin present in the solution.

Note that the particles, resin, solvent A, and solvent B are the same as those described in "PROPERTY 1 OF LIQUID COMPOSITION".

In order to adjust viscosity, adjust surface tension, control evaporation of solvents, improve solubility of additives, improve dispersibility of particles, disinfection, or the like, the liquid composition according to the present embodiment may further contain a surfactant, pH regulator, anticorrosive agent, antiseptic agent, antifungal agent, antioxidant, reducing agent, vaporization promoter, chelating agent, or the like.

The liquid composition according to the present embodiment may be prepared by using known dispersion devices.

Examples of dispersion devices include agitators, ball mills, bead mills, ring-type mills, high-pressure dispersers, rotary high-speed shearing devices, ultrasonic dispersion devices, and the like.

Liquid Composition Application Method

Examples of application methods of a liquid composition include, for example, dip coating, spray coating, spin coating, bar coating, slot die coating, doctor blade coating, offset printing, gravure printing, flexographic printing, letterpress printing, screen printing, liquid ejecting, and electrophotographic printing by a liquid development system. Among these, the liquid ejecting method is preferable in consideration of controllability of ejecting positions.

Examples of an ejecting system of the liquid composition used in the liquid ejecting method include a system of applying mechanical energy to a liquid composition, a system of applying thermal energy to a liquid composition, and the like. Among these, a system of applying mechanical energy to a liquid composition is preferable.

Note that when the liquid ejecting method is used, a technique utilizing a known liquid ejecting principle of a liquid ejecting device may be applied. However, as the solvents A and B contained in the liquid composition, it is preferable to use a solvent having resistance to a flow passage installed in the liquid ejecting device, and a solvent having resistance to nozzles of the liquid ejecting head.

An example of a liquid ejecting device is illustrated in FIG. 1.

In the liquid ejecting device 11, a cartridge 20 containing the liquid composition is housed in a carriage 18 within a main body housing 12. In this manner, the liquid composition is supplied from the cartridge 20 to a recording head 18a mounted on the carriage 18. The recording head 18a is enabled to eject the liquid composition.

The recording head 18a mounted on the carriage 18 is guided and moved along guide shafts 21 and 22 by a timing belt 23, which is driven by a main scanning motor 24. The absorbing medium is disposed by a platen 19 at a position facing the recording head 18a. Note that in FIG. 1, a reference numeral 16 represents a gear mechanism, a reference numeral 17 represents a sub-scanning motor, and a reference numeral 26 represents a main scanning motor.

Method of Using Liquid Composition

A method of using a liquid composition includes applying the liquid composition onto an absorbing medium.

The term "absorbing medium" means a medium capable of absorbing a liquid composition.

Specific examples of absorbing media include, for example, porous films.

It is possible to produce an integrated separator electrode when using an electrode substrate on which an electrode mixture layer containing an active material is formed, as a porous film.

Examples of a negative electrode active material include a carbon material capable of releasing or absorbing lithium ions, such as metallic lithium, lithium alloy, carbon, graphite, and the like, a conductive polymer doped with lithium ions, and the like.

Examples of a positive electrode active material include graphite fluoride represented by the general formula $(CF_x)_n$, metal oxides such as $CoLiO_2$, $MnO_2$, $V_2O_5$, $CuO$, $Ag_2CrO_4$, and $TiO_2$, and metal sulfides such as $CuS$.

Examples of the electrode substrate include copper foil, aluminum foil, and the like.

Other types of absorbing medium include, for example, a substrate used in a reflective display device, and an electrode layer used in a printed electronics.

Integrated Separator Electrode

An integrated separator electrode means an electrode having an electrode mixture layer and a particle layer sequentially formed on an electrode substrate.

FIGS. 2A and 2B illustrate examples of an integrated separator electrode.

Note that FIGS. 2A and 2B are a cross-sectional view and a top view, respectively.

An integrated separator electrode 30 includes an electrode mixture layer 32 and a particle layer 33. The electrode mixture layer 32 and the particle layer 33 are sequentially formed on an electrode substrate 31, and the liquid composition according to the present embodiment is used for forming the particle layer 33.

The use of the integrated separator electrode 30 eliminates a process of winding or laminating the electrode and separator separately in producing an electrochemical device, thereby greatly improving the production efficiency of the electrochemical device.

Examples of electrochemical devices include lithium-ion rechargeable batteries, magnesium ion secondary batteries, magnesium ion secondary batteries, sodium ion secondary batteries, and sodium secondary batteries.

The electrochemical device may be applied to a battery installed in a vehicle, a smartphone, or the like.

EXAMPLES

Hereinafter, examples of the present invention will be described, but the present invention is not limited by the examples. Note that "parts" and "%" are by mass unless otherwise specified.

Method of Sufficiently Dispersing Particles in Solvent by Resin

Particles, solvent, and resin were placed in predetermined amounts in a zirconia container of a cooling nano pulverizer NP-100 (made by THINKY CORPORATION) used as a bead mill, and then beads with a particle size of 0.2 mm were dispersed. At this time, the dispersion time was appropriately selected according to the combination of particles, solvents, and resin.

Particle Size Distribution of Liquid Composition or Dispersion Liquid

A laser diffraction particle size analysis instrument Mastersizer 3000 (made of Malvern Panalytical) was used to measure the particle size distribution of the liquid composition or dispersion liquid.

Note that $D_{50A}$ and $D_{90A}$ respectively represent a median diameter and a 90% diameter of a dispersion liquid, which is obtained by removing a solvent B from the liquid composition, $D_{50B}$ and $D_{90B}$ respectively represent a median diameter and a 90% diameter of a dispersion liquid, which is obtained by removing a solvent A from the liquid composition, and $D_{50A+B}$ and $D_{90A+B}$ respectively represent a median diameter and a 90% diameter of the liquid composition.

Note that if a cumulative value of a particle size of 0.1 μm or less was detected during measurement of the particle size distribution of the liquid composition or the dispersion liquid, such a value was determined to be unreliable, and the median diameter and 90% diameter were obtained by excluding the cumulative value of the particle size of 0.1 μm or less.

Surface Tension of Liquid Composition with Respect to Air

The surface tension of the liquid composition with respect to air was measured at 25° C. using a contact angle meter pocketDyne (made of KRuSS).

Example 1-1

Preparation of Dispersion Liquid

Using ammonium fumarate and 1.5% of a multifunctional comb-shaped polymer (resin) HKM-150A (produced by NOF CORPORATION) having ionic groups on a main chain and polyoxyethylene chains on graft chains, 50% of alumina particles AKP3000 (produced by Sumitomo Chemical Co., Ltd.) having a mean particle size of 0.8 μm was sufficiently dispersed in 48.5% of 1-methyl-2-pyrrolidone (solvent A), thereby obtaining a dispersion liquid with a solid content of 50%. The dispersion liquid had a $D_{50A}$ of 1 μm or less and a $D_{90A}$ of 2 μm or less.

Preparation of Liquid Composition

A liquid composition having a solid content of 30% was obtained by mixing 60% of the dispersion liquid, 30% of 1-methyl-2-pyrrolidone (solvent A), and 10% of propylene glycol (solvent B). The liquid composition had a $D_{50A+B}$ of 1 μm or less and a $D_{90A+B}$ of 2 μm or less.

Example 1-2

With reference to the preparation of the liquid composition described above, a liquid composition was obtained in the same manner as Example 1-1 (see Table 1), except that the amounts of 1-methyl-2-pyrrolidone and propylene glycol added were changed to 20% and 20%, respectively.

Example 1-3

With reference to the preparation of the liquid composition described above, a liquid composition was obtained in the same manner as Example 1-1 (see Table 1), except that the amounts of 1-methyl-2-pyrrolidone and propylene glycol added were changed to 10% and 30%, respectively.

Example 1-4

With reference to the preparation of the liquid composition described above, a liquid composition was obtained in the same manner as Example 1-1 (see Table 1), except that the amounts of 1-methyl-2-pyrrolidone and propylene glycol added were changed to 0% and 40%, respectively.

Example 2-1 to Example 2-4

A liquid composition was obtained in the same manner as Examples 1-1 to 1-4 except that dimethyl sulfoxide was used as solvent A (see Table 1).

Example 3-1 to Example 3-4

A liquid composition was obtained in the same manner as Examples 1-1 to 1-4 except that ethyl lactate was used as solvent A (see Table 1).

Example 4-1 to Example 4-4

A liquid composition was obtained in the same manner as Examples 1-1 to 1-4 except that diisobutyl ketone was used as solvent A, 2-pyrrolidone was used as solvent B, and a multifunctional comb-shaped polymer SC-0708A (produced by NOF CORPORATION) having ionic groups on a main chain and polyoxyalkylene chains on graft chains was used as resin (see Table 1).

Comparative Example 5-1 and Example 5-2 to Example 5-4

A liquid composition was obtained in the same manner as Examples 4-1 to 4-4 except that isopropyl alcohol was used as solvent A (see Table 1).

Example 6-1 to Example 6-4

A liquid composition was obtained in the same manner as Examples 1-1 to 1-4 except that ethylene glycol was used as solvent B (see Table 1).

Example 7-1 to Example 7-4

A liquid composition was obtained in the same manner as Examples 2-1 to 2-4 except that ethylene glycol was used as solvent B (see Table 1).

Example 8-1 to Example 8-4

A liquid composition was obtained in the same manner as Examples 3-1 to 3-4 except that ethylene glycol was used as solvent B (see Table 1).

Example 9-1 to Example 9-4

A liquid composition was obtained in the same manner as Examples 4-1 to 4-4 except that ethyl lactate was used as solvent A (see Table 1).

Example 10-1 to Example 10-4

A liquid composition was obtained in the same manner as Examples 4-1 to 4-4 except that diacetone alcohol was used as solvent A (see Table 2).

Example 11-1 to Example 11-4

A liquid composition was obtained in the same manner as Examples 4-1 to 4-4 except that cyclohexanone was used as solvent A (see Table 2).

Comparative Example 12-1 to Comparative Example 12-4

A liquid composition was obtained in the same manner as Examples 4-1 to 4-4 except that ethylene glycol was used as solvent B (see Table 2).

Comparative Example 13-1 to Comparative Example 13-4

A liquid composition was obtained in the same manner as Examples 4-1 to 4-4 except that propylene glycol was used as solvent B (see Table 2).

Comparative Example 14-1 to Comparative Example 14-4

A liquid composition was obtained in the same manner as Examples 10-1 to 10-4 except that ethylene glycol was used as solvent B (see Table 2).

Comparative Example 15-1 to Comparative Example 15-4

A liquid composition was obtained in the same manner as Examples 10-1 to 10-4 except that propylene glycol was used as solvent B (see Table 2).

Example 16-1 to Example 16-4

A liquid composition was obtained in the same manner as Examples 4-1 to 4-4 except that 1-methyl-2-pyrrolidone was used as solvent A (see Table 2).

Example 17-1 to Example 17-4

A liquid composition was obtained in the same manner as Examples 4-1 to 4-4 except that dimethyl sulfoxide was used as solvent A (see Table 2).

Example 18-1 to Example 18-4

A liquid composition was obtained in the same manner as Examples 1-1 to 1-4 except that 2-pyrrolidone was used as solvent B (see Table 2).

Example 19-1 to Example 19-4

A liquid composition was obtained in the same manner as Examples 2-1 to 2-4 except that 2-pyrrolidone was used as solvent B (see Table 3).

Example 20-1 to Example 20-4

A liquid composition was obtained in the same manner as Examples 4-1 to 4-4 except that butyl acetate was used as solvent A (see Table 3).

Example 21-1 to Example 21-4

A liquid composition was obtained in the same manner as Examples 4-1 to 4-4 except that 2-butanone was used as solvent A (see Table 3).

Comparative Example 22-1 to Comparative Example 22-4

A liquid composition was obtained in the same manner as Examples 6-1 to 1-4 except that water was used as solvent A, and a multifunctional comb-shaped polymer HKM-50A (produced by NOF CORPORATION) having ionic groups on a main chain and polyoxyalkylene chains on graft chains was used as resin (see Table 3).

Comparative Example 23-1 to Comparative Example 23-4

A liquid composition was obtained in the same manner as Examples 6-1 to 6-4 except that propylene glycol was used as solvent B (see Table 3).

Example 24-1

A liquid composition was obtained in the same manner as Comparative Examples 22-4 except that 1.4% of HKM-50A (produced by NOF CORPORATION) and 0.1% of fluorine-based surfactant F-444 (produced by DIC CORPORATION) were used instead of 1.5% of HKM-150A (produced by NOF CORPORATION) (see Table 3).

Example 25-1 to Example 25-4

A liquid composition was obtained in the same manner as Examples 9-1 to 9-4 except that cyclohexanol was used as solvent B (see Table 3).

Example 26-1 to Example 26-4

A liquid composition was obtained in the same manner as Examples 10-1 to 10-4 except that cyclohexanol was used as solvent B (see Table 3).

Example 27-1 to Example 27-4

A liquid composition was obtained in the same manner as Examples 11-1 to 11-4 except that cyclohexanol was used as solvent B (see Table 3).

Comparative Examples 28-1 and 28-2, and Examples 28-3 and 28-4

A liquid composition was obtained in the same manner as Comparative Example 5-1 and Examples 5-2 to 5-4, except that cyclohexanol was used as solvent B (see Table 3).

Example 29-1 to Example 29-4

A liquid composition was obtained in the same manner as Examples 1-1 to 1-4 except that propylene glycol monopropyl ether was used as solvent B (see Table 4).

Example 30-1 to Example 30-4

A liquid composition was obtained in the same manner as Examples 10-1 to 10-4 except that propylene glycol monopropyl ether was used as solvent B (see Table 4).

Example 31-1 to Example 31-4

A liquid composition was obtained in the same manner as Examples 20-1 to 20-4 except that propylene glycol monopropyl ether was used as solvent B (see Table 4).

Example 32-1 to Example 32-4

A liquid composition was obtained in the same manner as Examples 4-1 to 4-4 except that propylene glycol monopropyl ether was used as solvent B (see Table 4).

Example 33-1 to Example 33-4

A liquid composition was obtained in the same manner as Examples 9-1 to 9-4 except that propylene glycol monopropyl ether was used as solvent B (see Table 4).

Example 34-1 to Example 34-4

A liquid composition was obtained in the same manner as Examples 4-1 to 4-4 except that ethyl lactate was used as solvent A, and hexylene glycol was used as solvent B (see Table 5).

Example 35-1 to Example 35-4

A liquid composition was obtained in the same manner as Examples 34-1 to 34-4 except that ethylene glycol diacetate was used as solvent B (see Table 5).

Example 36-1 to Example 36-4

A liquid composition was obtained in the same manner as Examples 34-1 to 34-4 except that furfuryl alcohol was used as solvent B (see Table 5).

Example 37-1 to Example 37-4

A liquid composition was obtained in the same manner as Examples 4-1 to 4-4 except that 2-pentanone was used as solvent A, and hexylene glycol was used as solvent B (see Table 5).

Example 38-1 to Example 38-4

A liquid composition was obtained in the same manner as Examples 37-1 to 37-4 except that ethylene glycol diacetate was used as solvent B (see Table 5).

Example 39-1 to Example 39-4

A liquid composition was obtained in the same manner as Examples 4-1 to 4-4 except that ethylene glycol diacetate was used as solvent A, and hexylene glycol was used as solvent B (see Table 6).

Comparative Example 29-1 to Comparative Example 29-4

A liquid composition was obtained in the same manner as Examples 4-1 to 4-4 except that cyclohexanone was used as solvent A, and hexylene glycol was used as solvent B (see Table 6).

Example 40-1 to Example 40-4

A liquid composition was obtained in the same manner as Examples 39-1 to 39-4 except that diacetone alcohol was used as solvent A (see Table 6).

Comparative Examples 30-1 and 30-2, and Examples 41-1 and 41-2

A liquid composition was obtained in the same manner as Examples 39-1 to 39-4 except that isopropyl alcohol was used as solvent A (see Table 6).

Comparative Example 31-1 to Comparative Example 31-4

A liquid composition was obtained in the same manner as Examples 39-1 to 39-4 except that 1-methyl-2-pyrrolidone was used as solvent A (see Table 6).

Comparative Example 32-1 to Comparative Example 32-4

A liquid composition was obtained in the same manner as Examples 39-1 to 39-4 except that ethyl acetate was used as solvent A (see Table 7).

Comparative Example 33-1 to Comparative Example 33-4

A liquid composition was obtained in the same manner as Examples 39-1 to 39-4 except that butyl acetate was used as solvent A (see Table 7).

Comparative Example 34-1 to Comparative Example 34-4

A liquid composition was obtained in the same manner as Examples 39-1 to 39-4 except that 2-butanone was used as solvent A (see Table 7).

Comparative Example 35-1 to Comparative Example 35-4

A liquid composition was obtained in the same manner as Examples 39-1 to 39-4 except that dimethyl sulfoxide was used as solvent A (see Table 7).

Comparative Example 36-1 to Comparative Example 36-4

A liquid composition was obtained in the same manner as Examples 39-1 to 39-4 except that diisobutyl ketone was used as solvent A (see Table 7).

Preparation of Absorbing Medium

A slurry for a negative electrode material layer was obtained by mixing a negative electrode active material SCMG-XR. (produced by SHOWA DENKO K.K.), water, and resin. The obtained slurry was applied on a copper foil acting as a negative electrode substrate, which was then dried to form the negative electrode material layer. The obtained negative electrode material layer was used as an absorbing medium.

Preparation of Integrated Separator Cathode

A liquid ejecting device EV2500 and a liquid ejecting head MH5421F (produced by Ricoh) were used to discharge a liquid composition (ink) onto an absorbing medium, and then the liquid composition was dried to form a particle layer, thereby obtaining an integrated separator cathode. At this time, an appropriate discharge condition was set so that a mass per unit area of the particle layer was 1 mg/cm$^2$.

Note that the mass per unit area in this case indicates a mass per unit area of the particle layer formed on the absorbing medium.

Next, the thickness of the particle layer, electrically insulating resistance of the integrated separator cathode, and the coffee ring effect were measured.

Thickness of Particle Layer

A microdepth gauge was used to compare the thickness before and after formation of the particle layer to calculate the thickness of the particle layer. Note that wherever necessary, the particle layer was observed using a scanning electron microscope (SEM).

Electrically Insulating Resistance of Integrated Separator Cathode

After the integrated separator cathode was punched to a diameter of 15 mm, a rear surface of the copper foil (the surface on which the particle layer was not formed) and the particle layer were sandwiched by the resistance measuring instrument HS flat cell (produced by Hohsen Corp.), and the resistance between the two surfaces was measured, thereby obtaining the electrically insulating resistance of the integrated separator electrode.

Coffee Ring Effect

The particle layer was visually observed to check the presence/absence of the coffee ring effect.

Tables 1 to 7 indicate the thickness of the particle layer, the measurement results of the electrically insulating resistance of the integrated separator cathode, and the evaluation results of the coffee ring effect.

| | SOLVENT A | SOLVENT B | SOLVENT A:B SOLVENT RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| EXAMPLE 1-1 | 1-methyl-2-pyrrolidone | propylene glycol | 6:1 | HKM-150A | 40 | ≤1 | ≤2 | ≤1 | ≤2.5 | ≤3 | ≤300 | absent | 1< | 1~1.1 | <5 |
| EXAMPLE 1-2 | 1-methyl-2-pyrrolidone | propylene glycol | 5:2 | HKM-150A | 39 | ≤1 | ≤2 | ≤1 | ≤2.5 | ≤3 | ≤300 | absent | 1< | 1~1.1 | <5 |
| EXAMPLE 1-3 | 1-methyl-2-pyrrolidone | propylene glycol | 4:3 | HKM-150A | 39 | ≤1 | ≤2 | ≤1 | ≤2.5 | ≤3 | ≤300 | absent | 1< | 1~1.1 | <5 |
| EXAMPLE 1-4 | 1-methyl-2-pyrrolidone | propylene glycol | 3:4 | HKM-150A | 38 | ≤1 | ≤2 | ≤1 | ≤2.5 | ≤3 | ≤300 | absent | 1< | 1~1.1 | <5 |
| EXAMPLE 2-1 | dimethyl sulfoxide | propylene glycol | 6:1 | HKM-150A | 43 | ≤1 | ≤2 | ≤1 | ≤2.5 | ≤3 | ≤300 | absent | 1< | 1~1.1 | <5 |
| EXAMPLE 2-2 | dimethyl sulfoxide | propylene glycol | 5:2 | HKM-150A | 42 | ≤1 | ≤2 | ≤1 | ≤2.5 | ≤3 | ≤300 | absent | 1< | 1~1.1 | <5 |
| EXAMPLE 2-3 | dimethyl sulfoxide | propylene glycol | 4:3 | HKM-150A | 41 | ≤1 | ≤2 | ≤1 | ≤2.5 | ≤3 | ≤300 | absent | 1< | 1~1.1 | <5 |
| EXAMPLE 2-4 | dimethyl sulfoxide | propylene glycol | 3:4 | HKM-150A | 40 | ≤1 | ≤2 | ≤1 | ≤2.5 | ≤3 | ≤300 | absent | 1< | 1~1.1 | <5 |
| EXAMPLE 3-1 | ethyl lactate | propylene glycol | 6:1 | HKM-150A | 30 | ≤1 | ≤2 | ≤1 | ≤2.5 | ≤3 | ≤300 | absent | 1< | 1~1.1 | <5 |
| EXAMPLE 3-2 | ethyl lactate | propylene glycol | 5:2 | HKM-150A | 31 | ≤1 | ≤2 | ≤1 | ≤2.5 | ≤3 | ≤300 | absent | 1< | 1~1.1 | <5 |
| EXAMPLE 3-3 | ethyl lactate | propylene glycol | 4:3 | HKM-150A | 32 | ≤1 | ≤2 | ≤1 | ≤2.5 | ≤3 | ≤300 | absent | 1< | 1~1.1 | <5 |
| EXAMPLE 3-4 | ethyl lactate | propylene glycol | 3:4 | HKM-150A | 33 | ≤1 | ≤2 | ≤1 | ≤2.5 | ≤3 | ≤300 | absent | 1< | 1~1.1 | <5 |
| EXAMPLE 4-1 | diisobutyl ketone | propylene glycol | 6:1 | SC-0708A | 27 | ≤1 | ≤2 | ≤1 | ≤2.5 | ≤3 | ≤300 | absent | 1< | 1~1.1 | <5 |
| EXAMPLE 4-2 | diisobutyl ketone | 2-pyrrolidone | 5:2 | SC-0708A | 30 | ≤1 | ≤2 | ≤1 | ≤2.5 | ≤3 | ≤300 | absent | 1< | 1~1.1 | <5 |
| EXAMPLE 4-3 | diisobutyl ketone | 2-pyrrolidone | 4:3 | SC-0708A | 33 | ≤1 | ≤2 | ≤1 | ≤2.5 | ≤3 | ≤300 | absent | 1< | 1~1.1 | <5 |
| EXAMPLE 4-4 | diisobutyl ketone | 2-pyrrolidone | 3:4 | SC-0708A | 36 | ≤1 | ≤2 | ≤1 | ≤2.5 | ≤3 | ≤300 | absent | 1< | 1~1.1 | <5 |
| COMPARATIVE EXAMPLE 5-1 | isopropyl alcohol | 2-pyrrolidone | 6:1 | SC-0708A | 24 | ≤1 | ≤2 | ≤1 | ≤2.5 | <3 | <300 | absent | 1< | 1~1.1 | <5 |
| EXAMPLE 5-2 | isopropyl alcohol | 2-pyrrolidone | 5:2 | SC-0708A | 28 | ≤1 | ≤2 | ≤1 | ≤2.5 | ≤3 | ≤300 | absent | 1< | 1~1.1 | <5 |
| EXAMPLE 5-3 | isopropyl alcohol | 2-pyrrolidone | 4:3 | SC-0708A | 32 | ≤1 | ≤2 | ≤1 | ≤2.5 | ≤3 | ≤300 | absent | 1< | 1~1.1 | <5 |
| EXAMPLE 5-4 | isopropyl alcohol | 2-pyrrolidone | 3:4 | SC-0708A | 35 | ≤1 | ≤2 | ≤1 | ≤2.5 | ≤3 | ≤300 | absent | 1< | 1~1.1 | <5 |
| EXAMPLE 6-1 | 1-methyl-2-pyrrolidone | ethylene glycol | 6:1 | HKM-150A | 41 | ≤1 | ≤2 | ≤1 | ≤2.5 | ≤3 | ≤300 | absent | 1< | 1~1.1 | <5 |
| EXAMPLE 6-2 | 1-methyl-2-pyrrolidone | ethylene glycol | 5:2 | HKM-150A | 42 | ≤1 | ≤2 | ≤1 | ≤2.5 | ≤3 | ≤300 | absent | 1< | 1~1.1 | <5 |
| EXAMPLE 6-3 | 1-methyl-2-pyrrolidone | ethylene glycol | 4:3 | HKM-150A | 43 | ≤1 | ≤2 | ≤1 | ≤2.5 | ≤3 | ≤300 | absent | 1< | 1~1.1 | <5 |
| EXAMPLE 6-4 | 1-methyl-2-pyrrolidone | ethylene glycol | 3:4 | HKM-150A | 44 | ≤1 | ≤2 | ≤1 | ≤2.5 | ≤3 | ≤300 | absent | 1< | 1~1.1 | <5 |
| EXAMPLE 7-1 | dimethyl sulfoxide | ethylene glycol | 6:1 | HKM-150A | 44 | ≤1 | ≤2 | ≤1 | ≤2.5 | ≤3 | ≤300 | absent | 1< | 1~1.1 | <5 |
| EXAMPLE 7-2 | dimethyl sulfoxide | ethylene glycol | 5:2 | HKM-150A | 45 | ≤1 | ≤2 | ≤1 | ≤2.5 | ≤3 | ≤300 | absent | 1< | 1~1.1 | <5 |
| EXAMPLE 7-3 | dimethyl sulfoxide | ethylene glycol | 4:3 | HKM-150A | 45 | ≤1 | ≤2 | ≤1 | ≤2.5 | ≤3 | ≤300 | absent | 1< | 1~1.1 | <5 |
| EXAMPLE 7-4 | dimethyl sulfoxide | ethylene glycol | 3:4 | HKM-150A | 46 | ≤1 | ≤2 | ≤1 | ≤2.5 | ≤3 | ≤300 | absent | 1< | 1~1.1 | <5 |
| EXAMPLE 8-1 | ethyl lactate | ethylene glycol | 6:1 | HKM-150A | 31 | ≤1 | ≤2 | ≤1 | ≤2.5 | ≤3 | ≤300 | absent | 1< | 1~1.1 | <5 |
| EXAMPLE 8-2 | ethyl lactate | ethylene glycol | 5:2 | HKM-150A | 34 | ≤1 | ≤2 | ≤1 | ≤2.5 | ≤3 | ≤300 | absent | 1< | 1~1.1 | <5 |
| EXAMPLE 8-3 | ethyl lactate | ethylene glycol | 4:3 | HKM-150A | 37 | ≤1 | ≤2 | ≤1 | ≤2.5 | ≤3 | ≤300 | absent | 1< | 1~1.1 | <5 |
| EXAMPLE 8-4 | ethyl lactate | ethylene glycol | 3:4 | HKM-150A | 40 | ≤1 | ≤2 | ≤1 | ≤2.5 | ≤3 | ≤300 | absent | 1< | 1~1.1 | <5 |
| EXAMPLE 9-1 | ethyl lactate | 2-pyrrolidone | 6:1 | SC-0708A | 31 | ≤1 | ≤2 | ≤1 | ≤2.5 | ≤3 | ≤300 | absent | 1< | 1~1.1 | <5 |
| EXAMPLE 9-2 | ethyl lactate | 2-pyrrolidone | 5:2 | SC-0708A | 34 | ≤1 | ≤2 | ≤1 | ≤2.5 | ≤3 | ≤300 | absent | 1< | 1~1.1 | <5 |
| EXAMPLE 9-3 | ethyl lactate | 2-pyrrolidone | 4:3 | SC-0708A | 36 | ≤1 | ≤2 | ≤1 | ≤2.5 | ≤3 | ≤300 | absent | 1< | 1~1.1 | <5 |
| EXAMPLE 9-4 | ethyl lactate | 2-pyrrolidone | 3:4 | SC-0708A | 38 | ≤1 | ≤2 | ≤1 | ≤2.5 | ≤3 | ≤300 | absent | 1< | 1~1.1 | <5 |

TABLE 2

| | SOLVENT A | SOLVENT B | SOLVENT A:B RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}/D_{90A}$ [μm] |
|---|---|---|---|---|---|---|---|---|---|---|---|---|---|---|---|
| EXAMPLE 10-1 | diacetone alcohol | 2-pyrrolidone | 6:1 | SC-0708A | 32 | ≤1 | ≤2 | ≤1 | ≤2.5 | ≤3 | ≤300 | absent | <1 | 1~1.1 | <5 |
| EXAMPLE 10-2 | diacetone alcohol | 2-pyrrolidone | 5:2 | SC-0708A | 34 | ≤1 | ≤2 | ≤1 | ≤2.5 | ≤3 | ≤300 | absent | <1 | 1~1.1 | <5 |
| EXAMPLE 10-3 | diacetone alcohol | 2-pyrrolidone | 4:3 | SC-0708A | 36 | ≤1 | ≤2 | ≤1 | ≤2.5 | ≤3 | ≤300 | absent | <1 | 1~1.1 | <5 |
| EXAMPLE 10-4 | diacetone alcohol | 2-pyrrolidone | 3:4 | SC-0708A | 39 | ≤1 | ≤2 | ≤1 | ≤2.5 | ≤3 | ≤300 | absent | <1 | 1~1.1 | <5 |
| EXAMPLE 11-1 | cyclohexanone | 2-pyrrolidone | 6:1 | SC-0708A | 36 | ≤1 | ≤2 | ≤1 | ≤2.5 | ≤3 | ≤300 | absent | <1 | 1~1.1 | <5 |
| EXAMPLE 11-2 | cyclohexanone | 2-pyrrolidone | 5:2 | SC-0708A | 37 | ≤1 | ≤2 | ≤1 | ≤2.5 | ≤3 | ≤300 | absent | <1 | 1~1.1 | <5 |
| EXAMPLE 11-3 | cyclohexanone | 2-pyrrolidone | 4:3 | SC-0708A | 39 | ≤1 | ≤2 | ≤1 | ≤2.5 | ≤3 | ≤300 | absent | <1 | 1~1.1 | <5 |
| EXAMPLE 11-4 | cyclohexanone | 2-pyrrolidone | 3:4 | SC-0708A | 41 | ≤1 | ≤2 | ≤1 | ≤2.5 | ≤3 | ≤300 | absent | <1 | 1~1.1 | <5 |
| COMPARATIVE EXAMPLE 12-1 | diisobutyl ketone | ethylene glycol | 6:1 | SC-0708A | — | ≤1 | ≤2 | <1 | 2.5< | — | — | — | — | 1.1≤ | 5≤ |
| COMPARATIVE EXAMPLE 12-2 | diisobutyl ketone | ethylene glycol | 5:2 | SC-0708A | — | ≤1 | ≤2 | <1 | 2.5< | — | — | — | — | 1.1≤ | 5≤ |
| COMPARATIVE EXAMPLE 12-3 | diisobutyl ketone | ethylene glycol | 4:3 | SC-0708A | — | ≤1 | ≤2 | <1 | 2.5< | — | — | — | — | 1.1≤ | 5≤ |
| COMPARATIVE EXAMPLE 12-4 | diisobutyl ketone | ethylene glycol | 3:4 | SC-0708A | — | ≤1 | ≤2 | <1 | 2.5< | — | — | — | — | 1.1≤ | 5≤ |
| COMPARATIVE EXAMPLE 13-1 | diisobutyl ketone | propylene glycol | 6:1 | SC-0708A | — | ≤1 | ≤2 | <1 | 2.5< | — | — | — | — | 1.1≤ | 5≤ |
| COMPARATIVE EXAMPLE 13-2 | diisobutyl ketone | propylene glycol | 5:2 | SC-0708A | — | ≤1 | ≤2 | <1 | 2.5< | — | — | — | — | 1.1≤ | 5≤ |
| COMPARATIVE EXAMPLE 13-3 | diisobutyl ketone | propylene glycol | 4:3 | SC-0708A | — | ≤1 | ≤2 | <1 | 2.5< | — | — | — | — | 1.1≤ | 5≤ |
| COMPARATIVE EXAMPLE 13-4 | diisobutyl ketone | propylene glycol | 3:4 | SC-0708A | — | ≤1 | ≤2 | <1 | 2.5< | — | — | — | — | 1.1≤ | 5≤ |
| COMPARATIVE EXAMPLE 14-1 | diacetone alcohol | ethylene glycol | 6:1 | SC-0708A | — | ≤1 | ≤2 | <1 | 2.5< | — | — | — | — | 1.1≤ | 5≤ |
| COMPARATIVE EXAMPLE 14-2 | diacetone alcohol | ethylene glycol | 5:2 | SC-0708A | — | ≤1 | ≤2 | <1 | 2.5< | — | — | — | — | 1.1≤ | 5≤ |
| COMPARATIVE EXAMPLE 14-3 | diacetone alcohol | ethylene glycol | 4:3 | SC-0708A | — | ≤1 | ≤2 | <1 | 2.5< | — | — | — | — | 1.1≤ | 5≤ |
| COMPARATIVE EXAMPLE 14-4 | diacetone alcohol | ethylene glycol | 3:4 | SC-0708A | — | ≤1 | ≤2 | <1 | 2.5< | — | — | — | — | 1.1≤ | 5≤ |
| COMPARATIVE EXAMPLE 15-1 | diacetone alcohol | propylene glycol | 6:1 | SC-0708A | — | ≤1 | ≤2 | <1 | 2.5< | — | — | — | — | 1.1≤ | 5≤ |
| COMPARATIVE EXAMPLE 15-2 | diacetone alcohol | propylene glycol | 5:2 | SC-0708A | — | ≤1 | ≤2 | <1 | 2.5< | — | — | — | — | 1.1≤ | 5≤ |
| COMPARATIVE EXAMPLE 15-3 | diacetone alcohol | propylene glycol | 4:3 | SC-0708A | — | ≤1 | ≤2 | <1 | 2.5< | — | — | — | — | 1.1≤ | 5≤ |
| COMPARATIVE EXAMPLE 15-4 | diacetone alcohol | propylene glycol | 3:4 | SC-0708A | — | ≤1 | ≤2 | <1 | 2.5< | — | — | — | — | 1.1≤ | 5≤ |
| EXAMPLE 16-1 | 1-methyl-2-pyrrolidone | 2-pyrrolidone | 6:1 | SC-0708A | 41 | ≤1 | ≤2 | ≤1 | ≤2.5 | ≤3 | ≤300 | absent | <1 | 1~1.1 | <5 |
| EXAMPLE 16-2 | 1-methyl-2-pyrrolidone | 2-pyrrolidone | 5:2 | SC-0708A | 42 | ≤1 | ≤2 | ≤1 | ≤2.5 | ≤3 | ≤300 | absent | <1 | 1~1.1 | <5 |
| EXAMPLE 16-3 | 1-methyl-2-pyrrolidone | 2-pyrrolidone | 4:3 | SC-0708A | 43 | ≤1 | ≤2 | ≤1 | ≤2.5 | ≤3 | ≤300 | absent | <1 | 1~1.1 | <5 |
| EXAMPLE 16-4 | 1-methyl-2-pyrrolidone | 2-pyrrolidone | 3:4 | SC-0708A | 43 | ≤1 | ≤2 | ≤1 | ≤2.5 | ≤3 | ≤300 | absent | <1 | 1~1.1 | <5 |
| EXAMPLE 17-1 | dimethyl sulfoxide | 2-pyrrolidone | 6:1 | SC-0708A | 44 | ≤1 | ≤2 | ≤1 | ≤2.5 | ≤3 | ≤300 | absent | <1 | 1~1.1 | <5 |

TABLE 2-continued

| | SOLVENT A | SOLVENT B | SOLVENT A:B SOLVENT RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| EXAMPLE 17-2 | dimethyl sulfoxide | 2-pyrrolidone | 5:2 | SC-0708A | 44 | ≤1 | ≤2 | ≤1 | ≤2.5 | ≤3 | ≤300 | absent | 1< | 1~1.1 | <5 |
| EXAMPLE 17-3 | dimethyl sulfoxide | 2-pyrrolidone | 4:3 | SC-0708A | 45 | ≤1 | ≤2 | ≤1 | ≤2.5 | ≤3 | ≤300 | absent | 1< | 1~1.1 | <5 |
| EXAMPLE 17-4 | dimethyl sulfoxide | 2-pyrrolidone | 3:4 | SC-0708A | 45 | ≤1 | ≤2 | ≤1 | ≤2.5 | ≤3 | ≤300 | absent | 1< | 1~1.1 | <5 |
| EXAMPLE 18-1 | 1-methyl-2-pyrrolidone | 2-pyrrolidone | 6:1 | HKM-150A | 41 | ≤1 | ≤2 | ≤1 | ≤2.5 | ≤3 | ≤300 | absent | 1< | 1~1.1 | <5 |
| EXAMPLE 18-2 | 1-methyl-2-pyrrolidone | 2-pyrrolidone | 5:2 | HKM-150A | 42 | ≤1 | ≤2 | ≤1 | ≤2.5 | ≤3 | ≤300 | absent | 1< | 1~1.1 | <5 |
| EXAMPLE 18-3 | 1-methyl-2-pyrrolidone | 2-pyrrolidone | 4:3 | HKM-150A | 43 | ≤1 | ≤2 | ≤1 | ≤2.5 | ≤3 | ≤300 | absent | 1< | 1~1.1 | <5 |
| EXAMPLE 18-4 | 1-methyl-2-pyrrolidone | 2-pyrrolidone | 3:4 | HKM-150A | 43 | ≤1 | ≤2 | ≤1 | ≤2.5 | ≤3 | ≤300 | absent | 1< | 1~1.1 | <5 |

TABLE 3

| | SOLVENT A | SOLVENT B | SOLVENT A:B SOLVENT RATIO | RESIN | SURFACE TENSION [mN/m] | $D_{50A}$ [μm] | $D_{90A}$ [μm] | $D_{50A+B}$/ $D_{50A}$ [μm] | $D_{90A+B}$ [μm] | THICKNESS OF PARTICLE LAYER [μm] | RESISTANCE [Ω] | COFFEE RING | $D_{50B}$/ $D_{50A}$ | $D_{50A+B}$/ $D_{50A}$ | $D_{90A+B}$/ $D_{90A}$ [μm] |
|---|---|---|---|---|---|---|---|---|---|---|---|---|---|---|---|
| EXAMPLE 19-1 | dimethyl sulfoxide | 2-pyrrolidone | 6:1 | HKM-150A | 44 | ≤1 | ≤2 | ≤1 | ≤2.5 | ≤3 | ≤300 | absent | <1 | 1~1.1 | <5 |
| EXAMPLE 19-2 | dimethyl sulfoxide | 2-pyrrolidone | 5:2 | HKM-150A | 44 | ≤1 | ≤2 | ≤1 | ≤2.5 | ≤3 | ≤300 | absent | <1 | 1~1.1 | <5 |
| EXAMPLE 19-3 | dimethyl sulfoxide | 2-pyrrolidone | 4:3 | HKM-150A | 45 | ≤1 | ≤2 | ≤1 | ≤2.5 | ≤3 | ≤300 | absent | <1 | 1~1.1 | <5 |
| EXAMPLE 19-4 | dimethyl sulfoxide | 2-pyrrolidone | 3:4 | HKM-150A | 45 | ≤1 | ≤2 | ≤1 | ≤2.5 | ≤3 | ≤300 | absent | <1 | 1~1.1 | <5 |
| EXAMPLE 20-1 | butyl acetate | 2-pyrrolidone | 6:1 | SC-0708A | 28 | ≤1 | ≤2 | ≤1 | ≤2.5 | ≤3 | ≤300 | absent | <1 | 1~1.1 | <5 |
| EXAMPLE 20-2 | butyl acetate | 2-pyrrolidone | 5:2 | SC-0708A | 31 | ≤1 | ≤2 | ≤1 | ≤2.5 | ≤3 | ≤300 | absent | <1 | 1~1.1 | <5 |
| EXAMPLE 20-3 | butyl acetate | 2-pyrrolidone | 4:3 | SC-0708A | 34 | ≤1 | ≤2 | ≤1 | ≤2.5 | ≤3 | ≤300 | absent | <1 | 1~1.1 | <5 |
| EXAMPLE 20-4 | butyl acetate | 2-pyrrolidone | 3:4 | SC-0708A | 37 | ≤1 | ≤2 | ≤1 | ≤2.5 | ≤3 | ≤300 | absent | <1 | 1~1.1 | <5 |
| EXAMPLE 21-1 | 2-butanone | 2-pyrrolidone | 6:1 | SC-0708A | 27 | ≤1 | ≤2 | ≤1 | ≤2.5 | ≤3 | ≤300 | absent | <1 | 1~1.1 | <5 |
| EXAMPLE 21-2 | 2-butanone | 2-pyrrolidone | 5:2 | SC-0708A | 30 | ≤1 | ≤2 | ≤1 | ≤2.5 | ≤3 | ≤300 | absent | <1 | 1~1.1 | <5 |
| EXAMPLE 21-3 | 2-butanone | 2-pyrrolidone | 4:3 | SC-0708A | 33 | ≤1 | ≤2 | ≤1 | ≤2.5 | ≤3 | ≤300 | absent | <1 | 1~1.1 | <5 |
| EXAMPLE 21-4 | 2-butanone | 2-pyrrolidone | 3:4 | SC-0708A | 37 | ≤1 | ≤2 | ≤1 | ≤2.5 | ≤3 | ≤300 | absent | <1 | 1~1.1 | <5 |
| COMPARATIVE EXAMPLE 22-1 | water | ethylene glycol | 6:1 | HKM-150A | 69 | ≤1 | ≤2 | ≤1 | ≤2.5 | ≤3 | ≤300 | absent | <1 | 1~1.1 | <5 |
| COMPARATIVE EXAMPLE 22-2 | water | ethylene glycol | 5:2 | HKM-150A | 65 | ≤1 | ≤2 | ≤1 | ≤2.5 | ≤3 | ≤300 | absent | <1 | 1~1.1 | <5 |
| COMPARATIVE EXAMPLE 22-3 | water | ethylene glycol | 4:3 | HKM-150A | 62 | ≤1 | ≤2 | ≤1 | ≤2.5 | ≤3 | ≤300 | absent | <1 | 1~1.1 | <5 |
| COMPARATIVE EXAMPLE 22-4 | water | ethylene glycol | 3:4 | HKM-150A | 58 | ≤1 | ≤2 | ≤1 | ≤2.5 | ≤3 | ≤300 | absent | <1 | 1~1.1 | <5 |
| COMPARATIVE EXAMPLE 23-1 | water | propylene glycol | 6:1 | HKM-150A | 68 | ≤1 | ≤2 | ≤1 | ≤2.5 | ≤3 | ≤300 | absent | <1 | 1~1.1 | <5 |
| COMPARATIVE EXAMPLE 23-2 | water | propylene glycol | 5:2 | HKM-150A | 65 | ≤1 | ≤2 | ≤1 | ≤2.5 | ≤3 | ≤300 | absent | <1 | 1~1.1 | <5 |
| COMPARATIVE EXAMPLE 23-3 | water | propylene glycol | 4:3 | HKM-150A | 61 | ≤1 | ≤2 | ≤1 | ≤2.5 | ≤3 | ≤300 | absent | <1 | 1~1.1 | <5 |
| COMPARATIVE EXAMPLE 23-4 | water | propylene glycol | 3:4 | HKM-150A | 57 | ≤1 | ≤2 | ≤1 | ≤2.5 | ≤3 | ≤300 | absent | <1 | 1~1.1 | <5 |
| EXAMPLE 24-1 | water | ethylene glycol | 3:4 | HKM-150A, F444 | 49 | ≤1 | ≤2 | ≤1 | ≤2.5 | ≤3 | ≤300 | absent | <1 | 1~1.1 | <5 |
| EXAMPLE 25-1 | ethyl lactate | cyclohexanol | 6:1 | SC-0708A | 29 | ≤1 | ≤2 | ≤1 | ≤2.5 | ≤3 | ≤300 | absent | <1 | 1~1.1 | <5 |
| EXAMPLE 25-2 | ethyl lactate | cyclohexanol | 5:2 | SC-0708A | 30 | ≤1 | ≤2 | ≤1 | ≤2.5 | ≤3 | ≤300 | absent | <1 | 1~1.1 | <5 |
| EXAMPLE 25-3 | ethyl lactate | cyclohexanol | 4:3 | SC-0708A | 31 | ≤1 | ≤2 | ≤1 | ≤2.5 | ≤3 | ≤300 | absent | <1 | 1~1.1 | <5 |
| EXAMPLE 25-4 | ethyl lactate | cyclohexanol | 3:4 | SC-0708A | 32 | ≤1 | ≤2 | ≤1 | ≤2.5 | ≤3 | ≤300 | absent | <1 | 1~1.1 | <5 |
| EXAMPLE 26-1 | diacetone alcohol | cyclohexanol | 6:1 | SC-0708A | 30 | ≤1 | ≤2 | ≤1 | ≤2.5 | ≤3 | ≤300 | absent | <1 | 1~1.1 | <5 |
| EXAMPLE 26-2 | diacetone alcohol | cyclohexanol | 5:2 | SC-0708A | 31 | ≤1 | ≤2 | ≤1 | ≤2.5 | ≤3 | ≤300 | absent | <1 | 1~1.1 | <5 |
| EXAMPLE 26-3 | diacetone alcohol | cyclohexanol | 4:3 | SC-0708A | 31 | ≤1 | ≤2 | ≤1 | ≤2.5 | ≤3 | ≤300 | absent | <1 | 1~1.1 | <5 |
| EXAMPLE 26-4 | diacetone alcohol | cyclohexanol | 3:4 | SC-0708A | 32 | ≤1 | ≤2 | ≤1 | ≤2.5 | ≤3 | ≤300 | absent | <1 | 1~1.1 | <5 |
| EXAMPLE 27-1 | cyclohexanone | cyclohexanol | 6:1 | SC-0708A | 34 | ≤1 | ≤2 | ≤1 | ≤2.5 | ≤3 | ≤300 | absent | <1 | 1~1.1 | <5 |
| EXAMPLE 27-2 | cyclohexanone | cyclohexanol | 5:2 | SC-0708A | 34 | ≤1 | ≤2 | ≤1 | ≤2.5 | ≤3 | ≤300 | absent | <1 | 1~1.1 | <5 |
| EXAMPLE 27-3 | cyclohexanone | cyclohexanol | 4:3 | SC-0708A | 34 | ≤1 | ≤2 | ≤1 | ≤2.5 | ≤3 | ≤300 | absent | <1 | 1~1.1 | <5 |
| EXAMPLE 27-4 | cyclohexanone | cyclohexanol | 3:4 | SC-0708A | 34 | ≤1 | ≤2 | ≤1 | ≤2.5 | ≤3 | ≤300 | absent | <1 | 1~1.1 | <5 |
| COMPARATIVE EXAMPLE 28-1 | isopropyl alcohol | cyclohexanol | 6:1 | SC-0708A | 23 | ≤1 | ≤2 | ≤1 | ≤2.5 | <3 | <300 | absent | <1 | 1~1.1 | <5 |

TABLE 3-continued

| | SOLVENT A | SOLVENT B | SOLVENT A:B SOLVENT RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| COMPARATIVE EXAMPLE 28-2 | isopropyl alcohol | cyclohexanol | 5:2 | SC-0708A | 24 | ≤1 | ≤2 | ≤1 | ≤2.5 | <3 | <300 | absent | 1< | 1~1.1 | <5 |
| EXAMPLE 28-3 | isopropyl alcohol | cyclohexanol | 4:3 | SC-0708A | 27 | ≤1 | ≤2 | ≤1 | ≤2.5 | 3≤ | 300≤ | absent | 1< | 1~1.1 | <5 |
| EXAMPLE 28-4 | isopropyl alcohol | cyclohexanol | 3:4 | SC-0708A | 28 | ≤1 | ≤2 | ≤1 | ≤2.5 | 3≤ | 300≤ | absent | 1< | 1~1.1 | <5 |

| | SOLVENT A | SOLVENT B | SOLVENT A:B SOLVENT RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| EXAMPLE 29-1 | 1-methyl-2-pyrrolidone | propylene glycol monopropyl ether | 6:1 | HKM-150A | 38 | ≤1 | ≤2 | ≤1 | ≤2.5 | ≤3 | ≤300 | absent | 1< | 1~1.1 | <5 |
| EXAMPLE 29-2 | 1-methyl-2-pyrrolidone | Propylene glycol monopropyl ether | 5:2 | HKM-150A | 36 | ≤1 | ≤2 | ≤1 | ≤2.5 | ≤3 | ≤300 | absent | 1< | 1~1.1 | <5 |
| EXAMPLE 29-3 | 1-methyl-2-pyrrolidone | propylene glycol monopropyl ether | 4:3 | HKM-150A | 35 | ≤1 | ≤2 | ≤1 | ≤2.5 | ≤3 | ≤300 | absent | 1< | 1~1.1 | <5 |
| EXAMPLE 29-4 | 1-methyl-2-pyrrolidone | propylene glycol monopropyl ether | 3:4 | HKM-150A | 33 | ≤1 | ≤2 | ≤1 | ≤2.5 | ≤3 | ≤300 | absent | 1< | 1~1.1 | <5 |
| EXAMPLE 30-1 | diacetone alcohol | propylene glycol monopropyl ether | 6:1 | SC-0708A | 39 | ≤1 | ≤2 | ≤1 | ≤2.5 | ≤3 | ≤300 | absent | 1< | 1~1.1 | <5 |
| EXAMPLE 30-2 | diacetone alcohol | propylene glycol monopropyl ether | 5:2 | SC-0708A | 36 | ≤1 | ≤2 | ≤1 | ≤2.5 | ≤3 | ≤300 | absent | 1< | 1~1.1 | <5 |
| EXAMPLE 30-3 | diacetone alcohol | propylene glycol monopropyl ether | 4:3 | SC-0708A | 34 | ≤1 | ≤2 | ≤1 | ≤2.5 | ≤3 | ≤300 | absent | 1< | 1~1.1 | <5 |
| EXAMPLE 30-4 | diacetone alcohol | propylene glycol monopropyl ether | 3:4 | SC-0708A | 25 | ≤1 | ≤2 | ≤1 | ≤2.5 | ≤3 | ≤300 | absent | 1< | 1~1.1 | <5 |
| EXAMPLE 31-1 | butyl acetate | propylene glycol monopropyl ether | 6:1 | SC-0708A | 25 | ≤1 | ≤2 | ≤1 | ≤2.5 | ≤3 | ≤300 | absent | 1< | 1~1.1 | <5 |
| EXAMPLE 31-2 | butyl acetate | propylene glycol monopropyl ether | 5:2 | SC-0708A | 25 | ≤1 | ≤2 | ≤1 | ≤2.5 | ≤3 | ≤300 | absent | 1< | 1~1.1 | <5 |
| EXAMPLE 31-3 | butyl acetate | propylene glycol monopropyl ether | 4:3 | SC-0708A | 26 | ≤1 | ≤2 | ≤1 | ≤2.5 | ≤3 | ≤300 | absent | 1< | 1~1.1 | <5 |
| EXAMPLE 31-4 | butyl acetate | propylene glycol monopropyl ether | 3:4 | SC-0708A | 26 | ≤1 | ≤2 | ≤1 | ≤2.5 | ≤3 | ≤300 | absent | 1< | 1~1.1 | <5 |
| EXAMPLE 32-1 | diisobutyl ketone | propylene glycol monopropyl ether | 6:1 | SC-0708A | 25 | ≤1 | ≤2 | ≤1 | ≤2.5 | ≤3 | ≤300 | absent | 1< | 1~1.1 | <5 |
| EXAMPLE 32-2 | diisobutyl ketone | propylene glycol monopropyl ether | 5:2 | SC-0708A | 25 | ≤1 | ≤2 | ≤1 | ≤2.5 | ≤3 | ≤300 | absent | 1< | 1~1.1 | <5 |
| EXAMPLE 32-3 | diisobutyl ketone | propylene glycol monopropyl ether | 4:3 | SC-0708A | 25 | ≤1 | ≤2 | ≤1 | ≤2.5 | ≤3 | ≤300 | absent | 1< | 1~1.1 | <5 |
| EXAMPLE 32-4 | diisobutyl ketone | propylene glycol monopropyl ether | 3:4 | SC-0708A | 26 | ≤1 | ≤2 | ≤1 | ≤2.5 | ≤3 | ≤300 | absent | 1< | 1~1.1 | <5 |
| EXAMPLE 33-1 | ethyl lactat | propylene glycol monopropyl ether | 6:1 | SC-0708A | 28 | ≤1 | ≤2 | ≤1 | ≤2.5 | ≤3 | ≤300 | absent | 1< | 1~1.1 | <5 |
| EXAMPLE 33-2 | ethyl lactat | propylene glycol monopropyl ether | 5:2 | SC-0708A | 28 | ≤1 | ≤2 | ≤1 | ≤2.5 | ≤3 | ≤300 | absent | 1< | 1~1.1 | <5 |
| EXAMPLE 33-3 | ethyl lactat | propylene glycol monopropyl ether | 4:3 | SC-0708A | 28 | ≤1 | ≤2 | ≤1 | ≤2.5 | ≤3 | ≤300 | absent | 1< | 1~1.1 | <5 |
| EXAMPLE 33-4 | ethyl lactat | propylene glycol monopropyl ether | 3:4 | SC-0708A | 28 | ≤1 | ≤2 | ≤1 | ≤2.5 | ≤3 | ≤300 | absent | 1< | 1~1.1 | <5 |

| | SOLVENT A | SOLVENT B | SOLVENT A:B RATIO | RESIN | SURFACE TENSION [mN/m] | D₅₀ₐ [μm] | D₉₀ₐ [μm] | D₅₀ₐ₊ᵦ [μm] | D₉₀ₐ₊ᵦ [μm] | THICKNESS OF PARTICLE LAYER [μm] | RESISTANCE [Ω] | COFFEE RING | D₅₀ᵦ/D₅₀ₐ | D₅₀ₐ₊ᵦ/D₅₀ₐ | D₉₀ₐ₊ᵦ [μm] |
|---|---|---|---|---|---|---|---|---|---|---|---|---|---|---|---|
| EXAMPLE 34-1 | ethyl lactate | hexylene glycol | 6:1 | SC-0708A | 29 | ≤1 | ≤2 | ≤1 | ≤2.5 | ≤3 | ≤300 | absent | ≤1 | 1~1.1 | <5 |
| EXAMPLE 34-2 | ethyl lactate | hexylene glycol | 5:2 | SC-0708A | 30 | ≤1 | ≤2 | ≤1 | ≤2.5 | ≤3 | ≤300 | absent | ≤1 | 1~1.1 | <5 |
| EXAMPLE 34-3 | ethyl lactate | hexylene glycol | 4:3 | SC-0708A | 30 | ≤1 | ≤2 | ≤1 | ≤2.5 | ≤3 | ≤300 | absent | ≤1 | 1~1.1 | <5 |
| EXAMPLE 34-4 | ethyl lactate | hexylene glycol | 3:4 | SC-0708A | 31 | ≤1 | ≤2 | ≤1 | ≤2.5 | ≤3 | ≤300 | absent | ≤1 | 1~1.1 | <5 |
| EXAMPLE 35-1 | ethyl lactate | ethylene glycol diacetat | 6:1 | SC-0708A | 29 | ≤1 | ≤2 | ≤1 | ≤2.5 | ≤3 | ≤300 | absent | ≤1 | 1~1.1 | <5 |
| EXAMPLE 35-2 | ethyl lactate | ethylene glycol diacetat | 5:2 | SC-0708A | 30 | ≤1 | ≤2 | ≤1 | ≤2.5 | ≤3 | ≤300 | absent | ≤1 | 1~1.1 | <5 |
| EXAMPLE 35-3 | ethyl lactate | ethylene glycol diacetat | 4:3 | SC-0708A | 31 | ≤1 | ≤2 | ≤1 | ≤2.5 | ≤3 | ≤300 | absent | ≤1 | 1~1.1 | <5 |
| EXAMPLE 35-4 | ethyl lactate | ethylene glycol diacetat | 3:4 | SC-0708A | 32 | ≤1 | ≤2 | ≤1 | ≤2.5 | ≤3 | ≤300 | absent | ≤1 | 1~1.1 | <5 |
| EXAMPLE 36-1 | ethyl lactate | furfuryl alcohol | 6:1 | SC-0708A | 30 | ≤1 | ≤2 | ≤1 | ≤2.5 | ≤3 | ≤300 | absent | ≤1 | 1~1.1 | <5 |
| EXAMPLE 36-2 | ethyl lactate | furfuryl alcohol | 5:2 | SC-0708A | 31 | ≤1 | ≤2 | ≤1 | ≤2.5 | ≤3 | ≤300 | absent | ≤1 | 1~1.1 | <5 |
| EXAMPLE 36-3 | ethyl lactate | furfuryl alcohol | 4:3 | SC-0708A | 32 | ≤1 | ≤2 | ≤1 | ≤2.5 | ≤3 | ≤300 | absent | ≤1 | 1~1.1 | <5 |
| EXAMPLE 36-4 | ethyl lactate | furfuryl alcohol | 3:4 | SC-0708A | 34 | ≤1 | ≤2 | ≤1 | ≤2.5 | ≤3 | ≤300 | absent | ≤1 | 1~1.1 | <5 |
| EXAMPLE 37-1 | 2-pentanone | hexylene glycol | 6:1 | SC-0708A | 27 | ≤1 | ≤2 | ≤1 | ≤2.5 | ≤3 | ≤300 | absent | ≤1 | 1~1.1 | <5 |
| EXAMPLE 37-2 | 2-pentanone | hexylene glycol | 5:2 | SC-0708A | 28 | ≤1 | ≤2 | ≤1 | ≤2.5 | ≤3 | ≤300 | absent | ≤1 | 1~1.1 | <5 |
| EXAMPLE 37-3 | 2-pentanone | hexylene glycol | 4:3 | SC-0708A | 29 | ≤1 | ≤2 | ≤1 | ≤2.5 | ≤3 | ≤300 | absent | ≤1 | 1~1.1 | <5 |
| EXAMPLE 37-4 | 2-pentanone | hexylene glycol | 3:4 | SC-0708A | 30 | ≤1 | ≤2 | ≤1 | ≤2.5 | ≤3 | ≤300 | absent | ≤1 | 1~1.1 | <5 |
| EXAMPLE 38-1 | 2-pentanone | ethylene glycol diacetat | 6:1 | SC-0708A | 26 | ≤1 | ≤2 | ≤1 | ≤2.5 | ≤3 | ≤300 | absent | ≤1 | 1~1.1 | <5 |
| EXAMPLE 38-2 | 2-pentanone | ethylene glycol diacetat | 5:2 | SC-0708A | 27 | ≤1 | ≤2 | ≤1 | ≤2.5 | ≤3 | ≤300 | absent | ≤1 | 1~1.1 | <5 |
| EXAMPLE 38-3 | 2-pentanone | ethylene glycol diacetat | 4:3 | SC-0708A | 29 | ≤1 | ≤2 | ≤1 | ≤2.5 | ≤3 | ≤300 | absent | ≤1 | 1~1.1 | <5 |
| EXAMPLE 38-4 | 2-pentanone | ethylene glycol diacetat | 3:4 | SC-0708A | 30 | ≤1 | ≤2 | ≤1 | ≤2.5 | ≤3 | ≤300 | absent | ≤1 | 1~1.1 | <5 |

| | SOLVENT A | SOLVENT B | SOLVENT A:B RATIO | RESIN | SURFACE TENSION [mN/m] | $D_{50A}$ [μm] | $D_{90A}$ [μm] | $D_{50A+B}/D_{50A}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| EXAMPLE 39-1 | ethylene glycol diacetate | hexylene glycol | 6:1 | SC-0708A | 34 | ≤1 | ≤2 | ≤1 | ≤2.5 | 3≤ | 300≤ | absent | 1≤ | 1~1.1 | <5 |
| EXAMPLE 39-2 | ethylene glycol diacetate | hexylene glycol | 5:2 | SC-0708A | 34 | ≤1 | ≤2 | ≤1 | ≤2.5 | 3≤ | 300≤ | absent | 1≤ | 1~1.1 | <5 |
| EXAMPLE 39-3 | ethylene glycol diacetate | hexylene glycol | 4:3 | SC-0708A | 33 | ≤1 | ≤2 | ≤1 | ≤2.5 | 3≤ | 300≤ | absent | 1≤ | 1~1.1 | <5 |
| EXAMPLE 39-4 | ethylene glycol diacetate | hexylene glycol | 3:4 | SC-0708A | 33 | ≤1 | ≤2 | ≤1 | ≤2.5 | 3≤ | 300≤ | absent | 1≤ | 1~1.1 | <5 |
| COMPARATIVE EXAMPLE 29-1 | cyclohexanone | hexylene glycol | 6:1 | SC-0708A | — | ≤1 | ≤2 | 1< | 2.5< | — | — | — | — | 1.1< | 5≤ |
| COMPARATIVE EXAMPLE 29-2 | cyclohexanone | hexylene glycol | 5:2 | SC-0708A | — | ≤1 | ≤2 | 1< | 2.5< | — | — | — | — | 1.1< | 5≤ |
| COMPARATIVE EXAMPLE 29-3 | cyclohexanone | hexylene glycol | 4:3 | SC-0708A | — | ≤1 | ≤2 | 1< | 2.5< | — | — | — | — | 1.1< | 5≤ |
| COMPARATIVE EXAMPLE 29-4 | cyclohexanone | hexylene glycol | 3:4 | SC-0708A | — | ≤1 | ≤2 | 1< | 2.5< | — | — | — | — | 1.1< | 5≤ |
| EXAMPLE 40-1 | diacetone alcohol | hexylene glycol | 6:1 | SC-0708A | 30 | ≤1 | ≤2 | ≤1 | ≤2.5 | 3≤ | 300≤ | absent | 1≤ | 1~1.1 | <5 |
| EXAMPLE 40-2 | diacetone alcohol | hexylene glycol | 5:2 | SC-0708A | 30 | ≤1 | ≤2 | ≤1 | ≤2.5 | 3≤ | 300≤ | absent | 1≤ | 1~1.1 | <5 |
| EXAMPLE 40-3 | diacetone alcohol | hexylene glycol | 4:3 | SC-0708A | 31 | ≤1 | ≤2 | ≤1 | ≤2.5 | 3≤ | 300≤ | absent | 1≤ | 1~1.1 | <5 |
| EXAMPLE 40-4 | diacetone alcohol | hexylene glycol | 3:4 | SC-0708A | 31 | ≤1 | ≤2 | ≤1 | ≤2.5 | 3≤ | 300≤ | absent | 1≤ | 1~1.1 | <5 |
| COMPARATIVE EXAMPLE 30-1 | isopropyl alcohol | hexylene glycol | 6:1 | SC-0708A | 23 | ≤1 | ≤2 | ≤1 | ≤2.5 | <3 | <300 | absent | 1≤ | 1~1.1 | 5≤ |
| COMPARATIVE EXAMPLE 30-2 | isopropyl alcohol | hexylene glycol | 5:2 | SC-0708A | 24 | ≤1 | ≤2 | ≤1 | ≤2.5 | <3 | <300 | absent | 1≤ | 1~1.1 | 5≤ |
| EXAMPLE 41-1 | isopropyl alcohol | hexylene glycol | 4:3 | SC-0708A | 26 | ≤1 | ≤2 | ≤1 | ≤2.5 | 3≤ | 300≤ | absent | 1≤ | 1~1.1 | <5 |
| EXAMPLE 41-2 | isopropyl alcohol | hexylene glycol | 3:4 | SO-0708A | 28 | ≤1 | ≤2 | ≤1 | ≤2.5 | 3≤ | 300≤ | absent | 1≤ | 1~1.1 | <5 |
| COMPARATIVE EXAMPLE 31-1 | 1-methyl-2-pyrrolidone | hexylene glycol | 6:1 | SO-0708A | — | ≤1 | ≤2 | 1< | 2.5< | — | — | — | — | 1.1< | 5≤ |
| COMPARATIVE EXAMPLE 31-2 | 1-methyl-2-pyrrolidone | hexylene glycol | 5:2 | SC-0708A | — | ≤1 | ≤2 | 1< | 2.5< | — | — | — | — | 1.1< | 5≤ |
| COMPARATIVE EXAMPLE 31-3 | 1-methyl-2-pyrrolidone | hexylene glycol | 4:3 | SC-0708A | — | ≤1 | ≤2 | 1< | 2.5< | — | — | — | — | 1.1< | 5≤ |
| COMPARATIVE EXAMPLE 31-4 | 1-methyl-2-pyrrolidone | hexylene glycol | 3:4 | SC-0708A | — | ≤1 | ≤2 | 1< | 2.5< | — | — | — | — | 1.1< | 5≤ |

TABLE 7

| | SOLVENT A | SOLVENT B | SOLVENT A:B RATIO | RESIN | SURFACE TENSION [mN/m] | $D_{50A}$ [μm] | $D_{90A}$ [μm] | $D_{50A+B}$ [μm] | $D_{90A+B}$ [μm] | THICKNESS OF PARTICLE LAYER [μm] | RESISTANCE [Ω] | COFFEE RING | $D_{50B}/D_{50A}$ | $D_{50A+B}/D_{50A}$ | $D_{90A+B}$ [μm] |
|---|---|---|---|---|---|---|---|---|---|---|---|---|---|---|---|
| COMPARATIVE EXAMPLE 32-1 | ethyl acetate | hexylene glycol | 6:1 | SO-0708A | — | ≤1 | ≤2 | 1< | 2.5< | — | — | — | — | 1.1< | 5≤ |
| COMPARATIVE EXAMPLE 32-2 | ethyl acetate | hexylene glycol | 5:2 | SC-0708A | — | ≤1 | ≤2 | 1< | 2.5< | — | — | — | — | 1.1< | 5≤ |
| COMPARATIVE EXAMPLE 32-3 | ethyl acetate | hexylene glycol | 4:3 | SC-0708A | — | ≤1 | ≤2 | 1< | 2.5< | — | — | — | — | 1.1< | 5≤ |
| COMPARATIVE EXAMPLE 32-4 | ethyl acetate | hexylene glycol | 3:4 | SO-0708A | — | ≤1 | ≤2 | 1< | 2.5< | — | — | — | — | 1.1< | 5≤ |
| COMPARATIVE EXAMPLE 33-1 | butyl acetate | hexylene glycol | 6:1 | SO-0708A | — | ≤1 | ≤2 | 1< | 2.5< | — | — | — | — | 1.1< | 5≤ |
| COMPARATIVE EXAMPLE 33-2 | butyl acetate | hexylene glycol | 5:2 | SC-0708A | — | ≤1 | ≤2 | 1< | 2.5< | — | — | — | — | 1.1< | 5≤ |
| COMPARATIVE EXAMPLE 33-3 | butyl acetate | hexylene glycol | 4:3 | SC-0708A | — | ≤1 | ≤2 | 1< | 2.5< | — | — | — | — | 1.1< | 5≤ |
| COMPARATIVE EXAMPLE 33-4 | butyl acetate | hexylene glycol | 3:4 | SC-0708A | — | ≤1 | ≤2 | 1< | 2.5< | — | — | — | — | 1.1< | 5≤ |
| COMPARATIVE EXAMPLE 34-1 | 2-butanone | hexylene glycol | 6:1 | SO-0708A | — | ≤1 | ≤2 | 1< | 2.5< | — | — | — | — | 1.1< | 5≤ |
| COMPARATIVE EXAMPLE 34-2 | 2-butanone | hexylene glycol | 5:2 | SC-0708A | — | ≤1 | ≤2 | 1< | 2.5< | — | — | — | — | 1.1< | 5≤ |
| COMPARATIVE EXAMPLE 34-3 | 2-butanone | hexylene glycol | 4:3 | SC-0708A | — | ≤1 | ≤2 | 1< | 2.5< | — | — | — | — | 1.1< | 5≤ |
| COMPARATIVE EXAMPLE 34-4 | 2-butanone | hexylene glycol | 3:4 | SC-0708A | — | ≤1 | ≤2 | 1< | 2.5< | — | — | — | — | 1.1< | 5≤ |
| COMPARATIVE EXAMPLE 35-1 | dimethyl sulfoxide | hexylene glycol | 6:1 | SO-0708A | — | ≤1 | ≤2 | 1< | 2.5< | — | — | — | — | 1.1< | 5≤ |
| COMPARATIVE EXAMPLE 35-2 | dimethyl sulfoxide | hexylene glycol | 5:2 | SC-0708A | — | ≤1 | ≤2 | 1< | 2.5< | — | — | — | — | 1.1< | 5≤ |
| COMPARATIVE EXAMPLE 35-3 | dimethyl sulfoxide | hexylene glycol | 4:3 | SC-0708A | — | ≤1 | ≤2 | 1< | 2.5< | — | — | — | — | 1.1< | 5≤ |
| COMPARATIVE EXAMPLE 35-4 | dimethyl sulfoxide | hexylene glycol | 3:4 | SC-0708A | — | ≤1 | ≤2 | 1< | 2.5< | — | — | — | — | 1.1< | 5≤ |
| COMPARATIVE EXAMPLE 36-1 | diisobutyl ketone | hexylene glycol | 6:1 | SO-0708A | — | ≤1 | ≤2 | 1< | 2.5< | — | — | — | — | 1.1< | 5≤ |
| COMPARATIVE EXAMPLE 36-2 | diisobutyl ketone | hexylene glycol | 5:2 | SC-0708A | — | ≤1 | ≤2 | 1< | 2.5< | — | — | — | — | 1.1< | 5≤ |
| COMPARATIVE EXAMPLE 36-3 | diisobutyl ketone | hexylene glycol | 4:3 | SC-0708A | — | ≤1 | ≤2 | 1< | 2.5< | — | — | — | — | 1.1< | 5≤ |
| COMPARATIVE EXAMPLE 36-4 | diisobutyl ketone | hexylene glycol | 3:4 | SC-0708A | — | ≤1 | ≤2 | 1< | 2.5< | — | — | — | — | 1.1< | 5≤ |

Tables 1 to 7 indicate that the use of the liquid compositions of Examples increased the electrically insulating resistance of the integrated separator electrode, and did not cause the coffee ring effect.

By contrast, since the liquid compositions of Comparative Examples 5-1, 28-1, and 28-2, and Comparative Examples 30-1 and 30-2 had a surface tension of less than 25 mN/m with respect to air, and the use of the liquid compositions of Comparative Examples 5-1, 28-1, and 28-2, and Comparative Examples 30-1 and 30-2 reduced the electrically insulating resistance of the integrated separator electrode.

Due to the $D_{90A+B}$ exceeding 2 μm, the liquid compositions of Comparative Examples 12-1 to 12-4, Comparative Examples 13-1 to 13-4, Comparative Examples 14-1 to 14-4, Comparative Examples 15-1 to 15-4, Comparative Examples 29-1 to 29-4, Comparative Examples 31-1 to 31-4, Comparative Examples 32-1 to 32-4, Comparative Examples 33-1 to 33-4, Comparative Examples 34-1 to 34-4, Comparative Examples 35-1 to 35-4, and Comparative Examples 36-1 to 36-4 were less dispersible, and as a result, an integrated separator cathode could not be produced.

The surface tension of the liquid compositions of Comparative Examples 22 and 23 with respect to air exceeded 50 mN/m, thereby generating the coffee ring effect.

According to an aspect of the invention, a liquid composition capable of improving electrically insulating resistance of an integrated separator electrode and capable of preventing the occurrence of the coffee ring effect is provided.

REFERENCE SIGNS LIST 30 integrated separator electrode
31 electrode substrate
32 electrode mixture layer
33 particle layer The present application is based on and claims priority of Japanese Priority Application No. 2019-012588 filed on Jan. 28, 2019, and Japanese Priority Application No. 2019-215743 filed on Nov. 28, 2019, the entire contents of which are hereby incorporated herein by reference.

The invention claimed is:

1. A liquid composition, comprising:
    particles;
    a resin;
    a solvent A; and
    a solvent B differing from the solvent A,
    wherein a surface tension with respect to air at 25° C. is 25 mN/m or more and less than 50 mN/m, a 90% diameter is 2.5 μm or less, and a median diameter is 1 μm or less, and
    said liquid composition does not contain water.

2. The liquid composition according to claim 1, wherein the resin is a polymeric dispersant having dispersible groups and adsorptive groups.

3. The liquid composition according to claim 1, wherein the particles are inorganic particles.

4. The liquid composition according to claim 1, wherein the solvent A is at least one solvent selected from the group consisting of a lactam, an alcohol, a sulfoxide, an ester, and a ketone.

5. The liquid composition according to claim 1, wherein the solvent B is at least one solvent selected from the group consisting of an ether, a glycol, an ester, an alcohol, and a lactam.

6. A liquid composition, comprising:
    particles;
    a resin;
    a solvent A; and
    a solvent B differing from the solvent A,
    wherein when $D_{50A+B}$ (μm) represents a median diameter of the liquid composition, $D_{90A+B}$ (μm) represents a 90% diameter of the liquid composition, $D_{50A}$ (μm) represents a median diameter of a first dispersion liquid obtained by removing the solvent B from the liquid composition, and $D_{50B}$ (μm) represents a median diameter of a second dispersion liquid obtained by removing the solvent A from the liquid composition, the liquid composition satisfies the following formulas:

$1 < D_{50B}/D_{50A}$, $1 < D_{50A+B}/D_{50A} < 1.1$, and $D_{90A+B} < 5$ (μm) less, and said liquid composition does not contain water.

7. A liquid composition, comprising:
    a dispersion liquid containing particles, a resin, and a solvent A; and
    a solvent B differing from the solvent A, the liquid composition being produced by adding the solvent B to the dispersion liquid,
    wherein the liquid composition has a surface tension with respect to air at 25° C. of 25 mN/m or more and less than 50 mN/m, and a 90% diameter of 2.5 μm or less, the dispersion liquid has a median diameter of 1 μm or less, and
    said liquid composition does not contain water.

8. The liquid composition according to claim 1, wherein the particles are electrically insulating particles.

9. The liquid composition according to claim 8, wherein the liquid composition is used for production of an integrated separator electrode.

* * * * *